(12) United States Patent
Mahler

(10) Patent No.: US 12,471,017 B2
(45) Date of Patent: Nov. 11, 2025

(54) TECHNIQUES IMPROVING CONNECTION RELIABILITY DURING NAVIGATION IN CELLULAR NETWORKS

(71) Applicant: The Joan and Irwin Jacobs Technion-Cornell Institute, New York, NY (US)

(72) Inventor: Kim Mahler, New York, NY (US)

(73) Assignee: Voltela Inc., New York, NY (US)

( * ) Notice: Subject to any disclaimer, the term of this patent is extended or adjusted under 35 U.S.C. 154(b) by 428 days.

(21) Appl. No.: 18/154,579

(22) Filed: Jan. 13, 2023

(65) Prior Publication Data

US 2023/0239783 A1 Jul. 27, 2023

Related U.S. Application Data

(60) Provisional application No. 63/303,165, filed on Jan. 26, 2022.

(51) Int. Cl.
*H04W 48/20* (2009.01)
*H04B 17/391* (2015.01)
*H04W 48/16* (2009.01)

(52) U.S. Cl.
CPC ........ *H04W 48/20* (2013.01); *H04B 17/3913* (2015.01); *H04W 48/16* (2013.01)

(58) Field of Classification Search
CPC ... H04W 48/20; H04W 48/16; H04B 17/3913
See application file for complete search history.

(56) References Cited

U.S. PATENT DOCUMENTS 8,385,977 B2   2/2013   Fein et al.
9,193,458 B2   11/2015  Pongratz et al.
(Continued)

FOREIGN PATENT DOCUMENTS

CN   210111033 U   2/2020
ES   2734488       12/2019
(Continued)

OTHER PUBLICATIONS

International Search Report for PCT/IB2023/050339, dated Apr. 20, 2023. International Bureau of WIPO.
(Continued)

*Primary Examiner* — Duc C Ho
(74) *Attorney, Agent, or Firm* — M&B IP Analysts, LLC

(57) ABSTRACT

A system and method for improving connection reliability while navigating in cellular networks. Historical received by vehicles navigating within a cellular network are analyzed in order to create a signal propagation model. The cellular network is distributed across a geographic area including multiple cells, where each cell is a subdivision of the geographic area. The historical signals are received from transceivers deployed the cellular network. Based on the signal propagation model and an expected navigation path of the vehicle, a subset of transceivers within the cellular network is determined. The subset of transceivers is used for making selections about which transceivers the vehicle should communicate with, for example by transmitting the subset of transceivers to a system responsible for selecting which transceiver communicates with a given vehicle such that the system selects which transceiver to use from among the subset of transceivers.

19 Claims, 4 Drawing Sheets

(56) References Cited

U.S. PATENT DOCUMENTS

| | | |
|---|---|---|
| 10,009,910 B2 | 6/2018 | Reis et al. |
| 10,602,371 B2 | 3/2020 | Reis et al. |
| 10,833,756 B2 | 11/2020 | Reis et al. |
| 11,115,136 B1 | 9/2021 | Kim et al. |
| 2006/0227744 A1 | 10/2006 | Metke et al. |
| 2007/0142050 A1 | 6/2007 | Handforth et al. |
| 2015/0036663 A1 | 2/2015 | Kilpatrick et al. |
| 2016/0192321 A9 | 6/2016 | Reed et al. |
| 2019/0045406 A1* | 2/2019 | Kalathil ............ H04W 36/0094 |
| 2019/0259287 A1* | 8/2019 | Mustafic ............... H04W 48/04 |

FOREIGN PATENT DOCUMENTS

| | | |
|---|---|---|
| KR | 20200002882 A | 1/2020 |
| WO | 2018064182 A1 | 4/2018 |
| WO | 2020162759 A1 | 8/2020 |

OTHER PUBLICATIONS

Written Opinion of a Searching Authority for PCT/IB2023/050339, dated Apr. 20, 2023. International Bureau of WIPO.

* cited by examiner

TECHNIQUES IMPROVING CONNECTION RELIABILITY DURING NAVIGATION IN CELLULAR NETWORKS

CROSS-REFERENCE TO RELATED APPLICATIONS

This application claims the benefit of U.S. Provisional Patent Application No. 63/303,165 filed on Jan. 26, 2022, the contents of which are hereby incorporated by reference.

TECHNICAL FIELD

The present disclosure relates generally to navigation of vehicles requiring communications with networks, and more specifically to improving connection reliability while navigating in cellular networks.

BACKGROUND

As use of unmanned vehicles and vehicle navigation support systems continues to increase, so too does the need for improving automated or semi-automated navigation of vehicles. In particular, unmanned aerial vehicles, commonly referred to as drones, lack a human pilot and therefore often rely on communications with remote operators in order to navigate. As a result, drones and other unmanned vehicles must connect to networks and maintain those network connections. If a connection is lost when important navigation instructions would be received, then the drone may fail to navigate properly, which could result in harm to the drone, its surroundings, or nearby people. Thus, connection reliability is safety-critical for such implementations.

In many applications of drones, the drones are equipped with network interfaces in order to allow them to communicate with a cellular network. A cellular network is a communication network in which the link to and from each end node is wireless. The cellular network is distributed over land areas referred to as cells, with one or more transceivers deployed in each cell. The transceivers in each cell provide network coverage to the cell, which in turn allows for transmitting data to and from systems within the cell. The cells collectively provide network coverage over a broader geographic area. Using cellular networks with multiple transceivers in respective cells may offer several advantages over a single large transmitter such as requiring less power by vehicles communicating with the transceivers and providing a larger area of coverage than a single transceiver.

Although multiple transceiver networks provide advantages over single transceiver networks, navigation systems using cellular networks face new challenges as compared to using a single large transceiver. In particular, solutions involving cellular networks require identifying which transceivers should be connected to at different points in navigation, i.e., as the vehicle navigates away from one cell and toward another.

Techniques for cellular handover (also referred to as cellular handoff) attempt to provide connection stability and reliability, seeking to ensure that a connection is maintained as a vehicle moves away from one cell and toward others. Although the general concept of cellular handover is straightforward, cellular handover techniques are typically not simple or easy to implement and therefore present a significant challenge to users and providers of cellular networks.

While this challenge is relatively easy to address for ground-navigating vehicles because the closest transceivers normally provide optimal connectivity for ground-navigating vehicles, optimal connectivity for aerial vehicles is usually not as straightforward. In other words, the optimal transceivers at any given point in navigation may be different for a ground vehicle at coordinates (X,Y,0), i.e., ground, then for an aerial vehicle at coordinates (X,Y,Z) navigating within the same cells. This challenge is at least partially caused by differences in signal strength for different lobes relative to the transceivers.

In antenna engineering, lobes are local maxima of radiation patterns radiating from an antenna or other radiation source. The radiation pattern of many antennas features a pattern of lobes at various angles and directions. Each lobe includes an area in which the signal strength reaches a peak. The lobes of an antenna typically include a main lobe that has the highest power among lobes as well as several side lobes featuring local maxima that do not have as high power as the main lobe. Consequently, side lobes can also be characterized as energy that "leaks out" from an acoustic beam. An example illustration of this phenomenon is depicted in FIG. 1.

FIG. 1 is a lobe visibility diagram 100. The lobe visibility diagram illustrates a transceiver 110 from which a main lobe 120 and various side lobes 130 radiate. As depicted in FIG. 1, a drone 140 navigating in an airspace around the transceiver 110 may occupy one or more of the side lobes 130 at different points in navigation near the transceiver 110 instead of the main lobe 120. Determining which side lobe 130 offers the best signal as well as determining which transceiver (i.e., either the transceiver 110 or a different transceiver) would offer the best signal to the drone 140 at any given point in navigation is a non-trivial challenge.

In addition to general signal strength that varies between side lobes, the signal strength of signals receive by a drone can vary depending on other factors like the angle and direction of the lobe. Moreover, excessive side lobe radiation (e.g., as caused when many side lobes are present) or main lobe radiation (e.g., when the cell is far away from the drone) may cause interference that can further reduce signal strength. As signal strength ebbs and flows, some signals may be lost or delayed in receipt by a drone which, for the reasons noted above, could result in harm to people or damage to the drone and its environment. In rural areas, the main lobe is often at a zero degree horizontal angle in order to maximize the coverage area, while in urban areas the first null (i.e., the first minima above the main lobe) is disposed at zero degrees. As a result, flying at cell tower antenna altitude results in maximizing receive power when in rural areas but results in no signals being received in urban areas.

The result of the above variations in signal strength from side lobes is that many attempts at large-scale drone adoption are hindered by loss of connectivity as signals lose strength during navigation. As a result, it would be desirable to provide solutions for maintaining connectivity despite changes signal intensities as drones navigate in and out of different lobes of transceivers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improving connection reliability in cellular networks. The method comprises: creating a signal propagation model based on a plurality of signals received from at least a portion of a plurality of transceivers by at least one first vehicle navigating in a cellular network, wherein the cellular network is distributed over a geographic area including a plurality of cells having the plurality of transceivers, wherein each cell of the plurality of cells is a subdivision of the geographic area in which at least one transceiver of the plurality of transceivers is deployed; determining, based on the signal propagation model and an expected navigation path of a second vehicle, at least one subset of transceivers to be used for transceiver selection, wherein each subset of transceivers includes a subset plurality of cells from among the plurality of cells; and causing the at least one subset of transceivers to be used for transceiver selection with respect to the second vehicle.

Certain embodiments disclosed herein also include a non-transitory computer readable medium having stored thereon causing a processing circuitry to execute a process, the process comprising: creating a signal propagation model based on a plurality of signals received from at least a portion of a plurality of transceivers by at least one first vehicle navigating in a cellular network, wherein the cellular network is distributed over a geographic area including a plurality of cells having the plurality of transceivers, wherein each cell of the plurality of cells is a subdivision of the geographic area in which at least one transceiver of the plurality of transceivers is deployed; determining, based on the signal propagation model and an expected navigation path of a second vehicle, at least one subset of transceivers to be used for transceiver selection, wherein each subset of transceivers includes a subset plurality of cells from among the plurality of cells; and causing the at least one subset of transceivers to be used for transceiver selection with respect to the second vehicle.

Certain embodiments disclosed herein also include a system for improving connection reliability in cellular networks. The system comprises: a processing circuitry; and a memory, the memory containing instructions that, when executed by the processing circuitry, configure the system to: create a signal propagation model based on a plurality of signals received from at least a portion of a plurality of transceivers by at least one first vehicle navigating in a cellular network, wherein the cellular network is distributed over a geographic area including a plurality of cells having the plurality of transceivers, wherein each cell of the plurality of cells is a subdivision of the geographic area in which at least one transceiver of the plurality of transceivers is deployed; determine, based on the signal propagation model and an expected navigation path of a second vehicle, at least one subset of transceivers to be used for transceiver selection, wherein each subset of transceivers includes a subset plurality of cells from among the plurality of cells; and cause the at least one subset of transceivers to be used for transceiver selection with respect to the second vehicle.

BRIEF DESCRIPTION OF THE DRAWINGS

The subject matter disclosed herein and other objects, features, and advantages of the disclosed embodiments will be apparent from the following detailed description taken in conjunction with the accompanying drawings.

DETAILED DESCRIPTION

Figure 1:
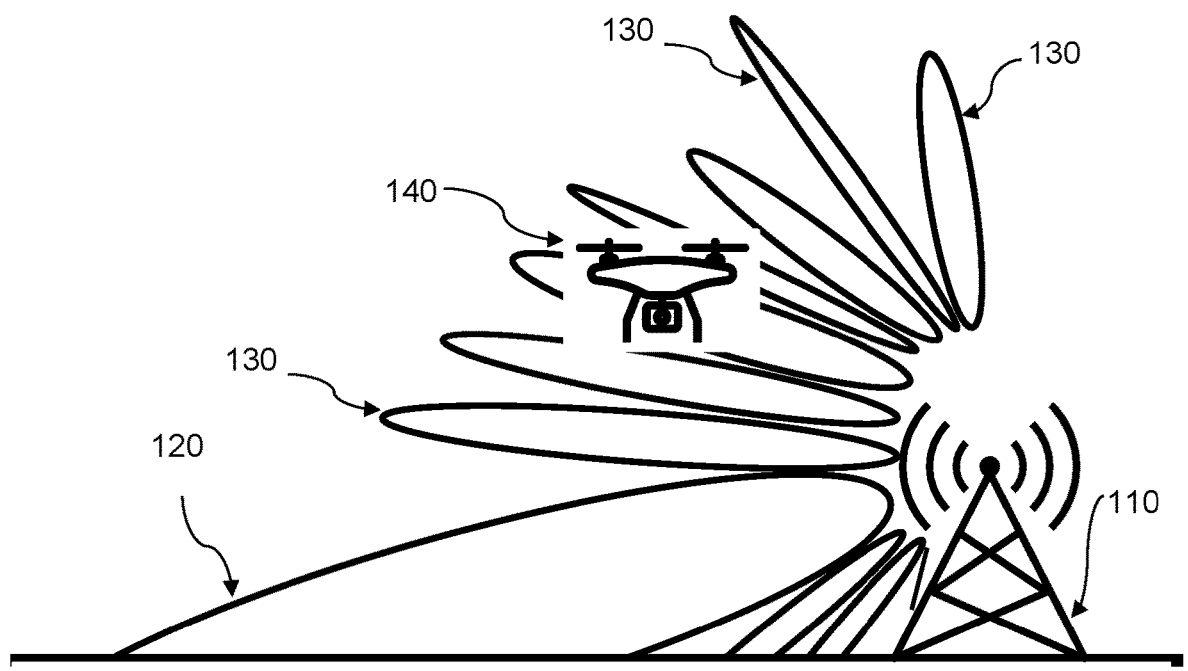
FIG. 1 is a lobe visibility diagram.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for improving connection reliability during navigation in cellular networks. A signal propagation model of the cellular network is created based on historical signals received by one or more vehicles (e.g., an unmanned aerial vehicle, also commonly called a drone) from multiple transceivers during navigation in a cellular network. Each transceiver is deployed in a respective cell, where each cell is a geographic area which is a subdivision of a broader geographic area. Handover handling parameters indicating how external systems in the cellular network handle handover are determined. These handover handling parameters can be utilized to predict when and how handovers will occur when moving among cells in the cellular network. The signal propagation values used to populate the model, the handover handling parameters, or both, may be learned via respective machine learning processes.

Based on the signal propagation model, an expected navigation path of a vehicle, and optionally the determined handover handling parameters, one or more appropriate subsets of transceivers are identified for the vehicle. Each determined subset of transceivers includes transceivers which are expected to provide the most reliable signals (e.g., with respect to availability, continuity, latency or a combination thereof) to the vehicle as the vehicle navigates in the cellular network.

The appropriate subsets of transceivers are used to select transceivers to which the vehicle should connect. In an embodiment, each subset of transceivers is transmitted to an external system that is configured to select transceivers for sending signals to a given vehicle. The external system uses the subset of transceivers determined for each point along the expected navigation path during transceiver selection such that the external system selects transceivers to communicate with the vehicle at the respective point from among transceivers deployed within the subset of transceivers.

In this regard, it has been identified that cellular networks typically utilize one or more systems for coordinating communications between transceivers and devices such as drones or cell phones. Specifically, such systems select the transceiver to use to communicate with a device at any given point in time from among multiple potential transceivers. It is further noted that the transceiver selecting system may need to have multiple potential transceiver options such that providing the transceiver selecting system with only the "best" transceiver for an expected future position of a device may cause instances where the "best" transceiver is unavailable and the system must revert back to a default secondary transceiver or otherwise select a transceiver based on transceiver position rather than actual signal strengths received by the device.

Accordingly, various disclosed embodiments address this challenge and provide better connectivity by providing a subset of transceivers including multiple transceivers to a transceiver selecting system such that the transceiver selection system can select an appropriate transceiver based on the subset and factors such as, but not limited to, availability. Thus, when the disclosed techniques are used, the transceiver selecting system will be able to select a suitable transceiver more often, thereby ensuring improved connectivity as compared to existing solutions.

Additionally, by modeling signals actually received by the vehicle, the subset of transceivers from which transceivers should be selected can be determined more accurately than, for example, solutions which only consider relative locations of the transceivers and the vehicle. In particular, the modeling allows for accounting for factors beyond position such as interference and how handovers are actually handled by vehicles moving in the cellular network, which may have effects on signal strength. This, in turn, may allow for mitigating such interference by avoiding positions with the highest amounts of interference.

Moreover, signal data modeled during previous flights may be further utilized in accordance with various disclosed embodiments to further improve predictions of future signal strength for different transceivers, thereby further improving transceiver selection and, consequently, connection reliability.

The techniques described herein allow for enhancing connection reliability, particularly for beyond visual line of sight (BVLOS) operations using drones. The disclosed techniques can be utilized with various generations of networks (e.g., 2G, 3G, 4G, 5G, etc.) while delivering improved connection reliability. The disclosed embodiments therefore allow for improvements related to connection reliability such as, but not limited to, minimizing ping-pong handover, reducing radio link failures, and minimizing connection losses.

Figure 2:
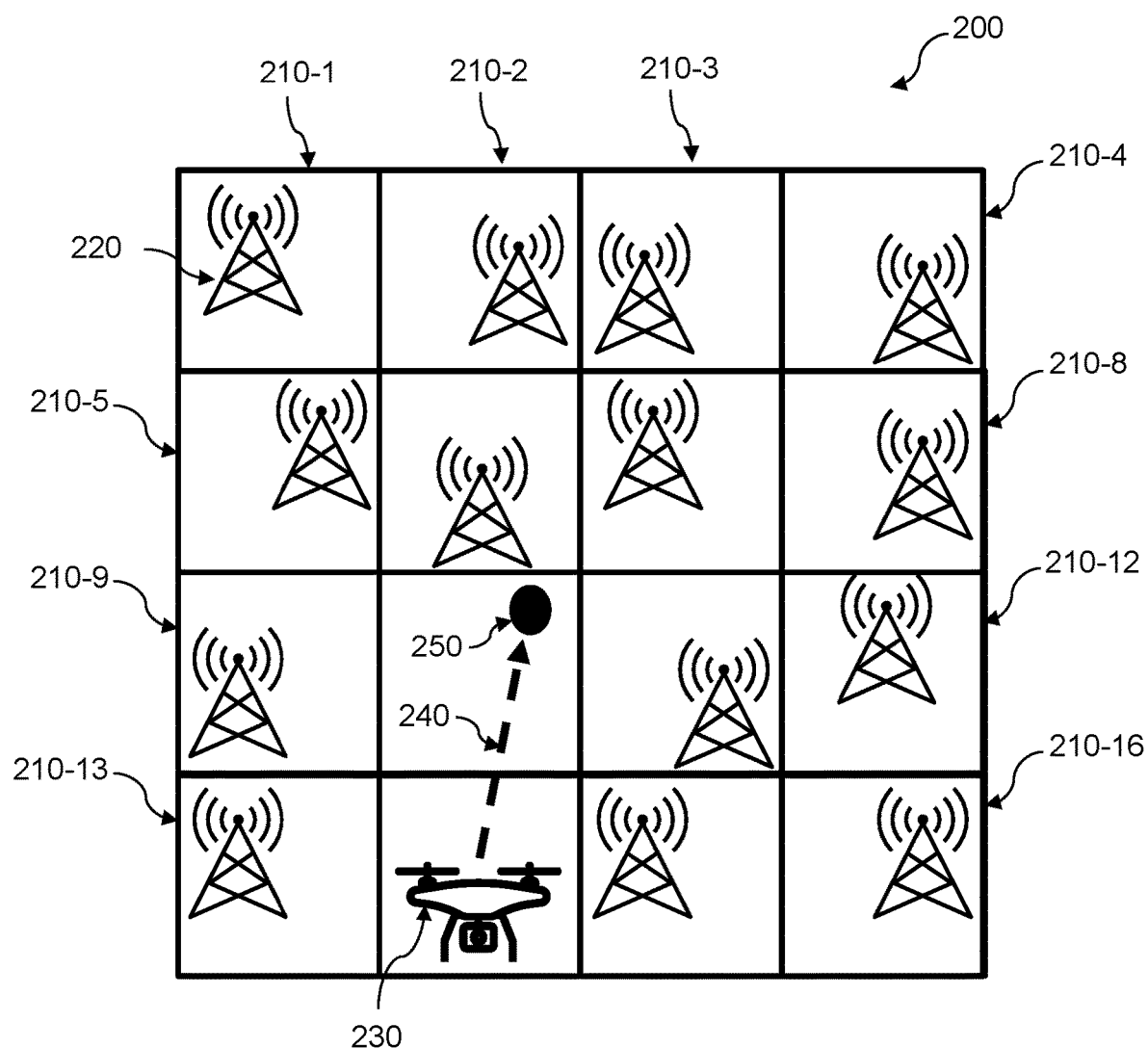
FIG. 2 is a cellular network diagram utilized to describe various disclosed embodiments.

FIG. 2 is an example cellular network diagram 200 utilized to describe various disclosed embodiments.

As depicted in FIG. 2, a cellular network includes multiple cells 210-1 through 210-16 (when a specific cell is not being referenced, hereinafter referred to as cells 210 or as a cell 210), each cell having a respective transceiver 220 deployed therein. In the cellular network diagram network diagram 200, a drone 230 navigates among the cells 210. Specifically, the drone 230 is expected to travel along an expected navigation path 240 within the cells 210. The expected navigation path 240 includes navigating to a point 250.

As described herein, in various embodiments, signals from previous drones (not shown) received from one or more of the transceivers 220 are modeled with respect to signal strength. To this end, in various embodiments, the resulting model may be a three-dimensional (3D) model having various 3D points in space, with signal strength values from different transceivers 220 stored with respect to each point in 3D space of the cellular network represented by a point of the model.

Based on the model and the expected navigation path 240, a subset of the transceivers 220 to be used for communications with the vehicle are determined. Specifically, the subset of the transceivers 220 may be determined such that, for example, the transceivers of the subset provide the most stable signal strength for a given point along the expected navigation path 240. As a non-limiting example, for the point 250, a subset of transceivers including the transceivers 220 deployed in cells 210-5, 210-9, and 210-12 may be determined as providing the highest respective signal stability for the point 250 or as collectively providing the highest stability for points along the navigation path 240. As discussed further below, determining which subsets of transceivers collectively provide the most stable signals for a given series of points may further include accounting for how handovers are handled by systems that manage the transceivers 220.

It should be noted that a single transceiver 220 is depicted in each cell 210 merely for simplicity purposes, and that multiple transceivers 220 may be deployed in any given cell without departing from the scope of the disclosure. It should also be noted that the navigation path 240 is depicted in only two dimensions merely for simplicity and for use in explaining an example cellular environment in which the disclosed embodiments can be utilized, but that the disclosed embodiments include navigation paths along three-dimensional routes include changes in 3 different axes of movement.

Figure 3:
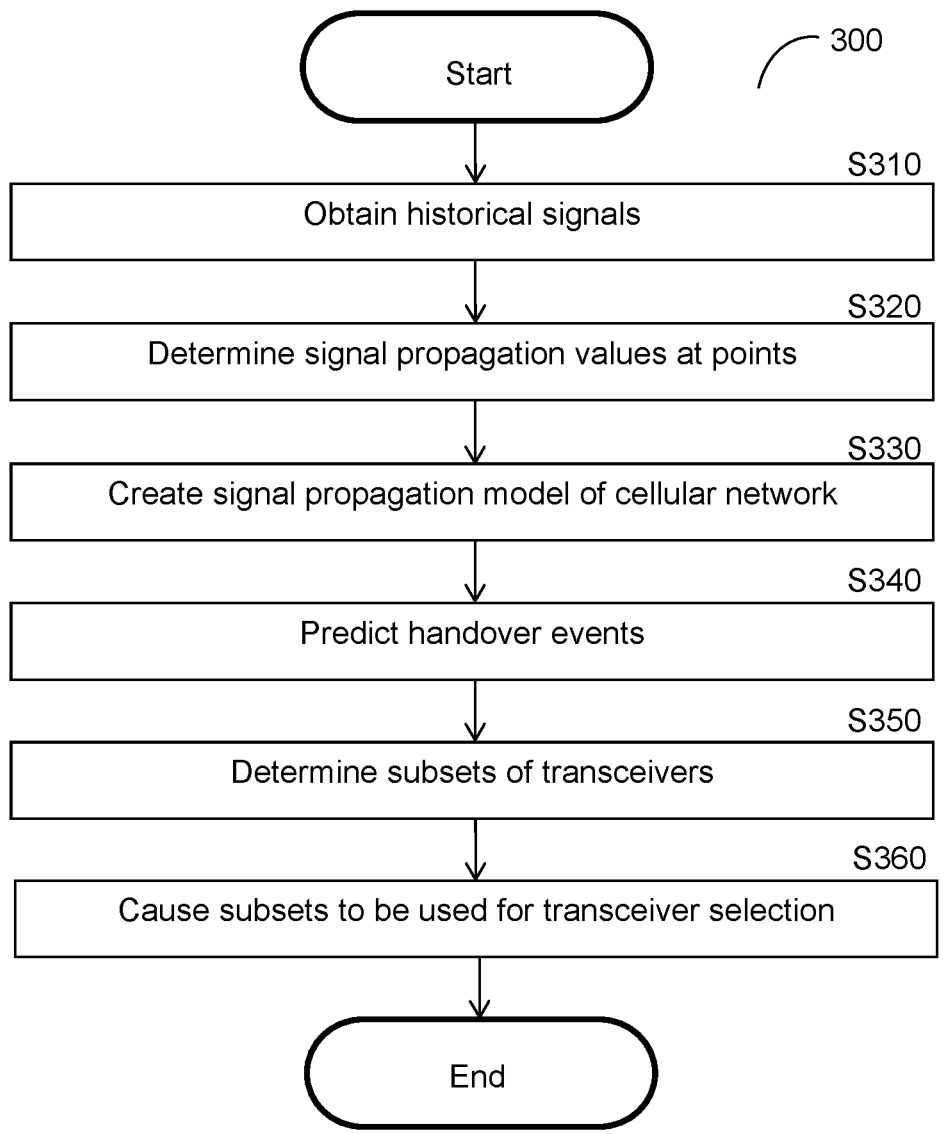
FIG. 3 is a flowchart illustrating a method for improving connection reliability during navigation in cellular networks according to an embodiment.

FIG. 3 is an example flowchart illustrating a method for improving connection reliability while navigating in a cellular network according to an embodiment. In an embodiment, the method may be performed by a computer system (e.g., the hardware layer 400, FIG. 4) installed on a vehicle (e.g., the drone 210, FIG. 2).

At S310, historical signals received from vehicles navigating in a cellular network are obtained. The historical signals may be received as signal values in the form of, for example but not limited to, reference signal received power (RSRP) data. The received signals may further have corresponding cell identifiers, which in turn can be utilized to identify the transceiver from which the signal was received. Moreover, the historical signals may be received alongside corresponding historical location markers (e.g., geographic coordinates) indicating locations where vehicles received the historical signals from transceivers in the cellular network.

At S320, signal propagation values are determined for each transceiver at each 3D point within the cellular network. The determined signal propagation values indicate transceiver characteristics which may be utilized to determine signal propagation values with respect to one of the points in the cellular network. These signal propagation values can be utilized in order to predict signal stability of signals projected by each transceiver to a vehicle positioned at any given point in the cellular network and may include, but are not limited to, initial signal strengths, transceiver position, transceiver orientation, transceiver configuration parameters, combinations thereof, and the like.

In an embodiment, S320 may include applying a machine learning model trained to determine expected signal propagation values for different locations within a cellular network. The signal propagation value machine learning model may be trained based on a training set including training signals and training cell identifiers for one or more cellular networks. In some embodiments, the signal propagation value machine learning model is a reinforcement learning model, and the training includes performing actions including making navigating decisions for vehicles in the cellular network and noting rewards defined with respect to one or more signal stability parameters. The signal propagation value machine learning model is trained to output signal propagation values for transceivers in a cellular network at each location within the cellular network. Consequently, applying the signal propagation value machine learning model to the historical signals, cell identifiers, and vehicle locations results in determining signal propagation values for each transceiver (e.g., the transceiver in each cell) at each of the 3D points in the cellular network.

At S330, a signal propagation model of the cellular network is created based on the historical signals. More specifically, the signal propagation model may be a three-dimensional (3D) having various 3D points, and each 3D point may be associated with multiple signal propagation values (e.g., the signal propagation values determined at S320) associated with respective transceivers deployed in the cellular network. To this end, the 3D points of the model may be points of a 3D digital twin of the cellular network, i.e., a virtual representation of the physical environment of the cellular network.

At optional S340, one or more handover events are predicted based on an expected navigation path of the vehicle within the cellular network. The predicted handover events may include indications of which transceivers will be involved in the handover and at which points in the cellular network the handover events will occur.

In an embodiment, S340 includes applying a machine learning model trained to predict handover events based on training data related to vehicle navigation and training handover events that occurred during vehicle navigations. The resulting model is trained to output handover handling parameters for different points in a cellular network based on the expected navigation path of the vehicle, i.e., based on the points in which the vehicle is going to travel through while following the expected navigation path.

In this regard, it is noted that handover handling tends to vary between different cellular networks, and that information about handover handling may not be available to users of vehicles such as drones navigating in the cellular network. Using machine learning to predict handover events allows for performing test runs in a given cellular network and learning handover handling patterns, thereby allowing for effectively predicting how handovers will be handled. The resulting handover event predictions, in turn, can be utilized when selecting transceivers to further improve connection stability.

At S350, when subsequent navigation of a vehicle is required, one or more subsets of transceivers are determined for points along an expected navigation path of the vehicle based on the signal propagation model. In an embodiment, each subset of transceivers is determined such that the transceivers in the subset provide the most stable signal strength (e.g., as determined based on respective values of the signal propagation model). Specifically, stability may be defined with respect to reliability in terms of aviation requirements based on parameters such as, but not limited to, availability, continuity, latency, combinations thereof, and the like. Moreover, when stability is defined with respect to a combination of parameters, S340 may include scoring stability using a weighted scoring algorithm with respect to each parameter in order to determine a stability score for each transceiver at a given point or series of points (i.e., points corresponding to locations within the cellular network such as points along the expected navigation path), where a subset of transceivers is selected based on transceivers having the highest stability scores.

More particularly, the signal propagation values stored associated with different points in the model may be utilized to determine an expected signal stability from each transceiver at each point along the expected navigation path using techniques generally known to individuals having ordinary skill in the art, thereby allowing for determining which transceivers are likely to provide the most stability at a given point.

In a further embodiment, in addition to using signal stability parameters for individual points in the cellular network determined based on the values of the signal propagation model, the subsets of transceivers may be determined based on the predicted handover events. As a non-limiting example, the transceivers involved in the predicted handover events may be utilized in combination with potential transceivers which might be used along the expected navigation path in order to determine which transceivers will provide the most stable connections even after a handover occurs such that a different transceiver communicates with the vehicle after the handover.

At S360, the subsets of transceivers determined at S340 are provided to a system for use in transceiver selection in order to select transceivers for communicating with the vehicle. In an embodiment, S350 includes transmitting the subsets of transceivers from the vehicle to one or more external systems configured for transceiver selection in the cellular network. As noted above, such systems select transceivers for use based on factors including expected signal strength (e.g., based on relative positions of the vehicle and each transceiver) and availability. Transmitting transceivers to use for communications with a navigating vehicle determined based on signals received by the vehicle allows for providing more accurate selection of optimal transceivers. Moreover, by transmitting subsets of transceivers including multiple transceivers each, the transceiver selecting system is allowed to select one of the subset based further on factors such as, for example, availability, load balancing, and the like.

Figure 4:
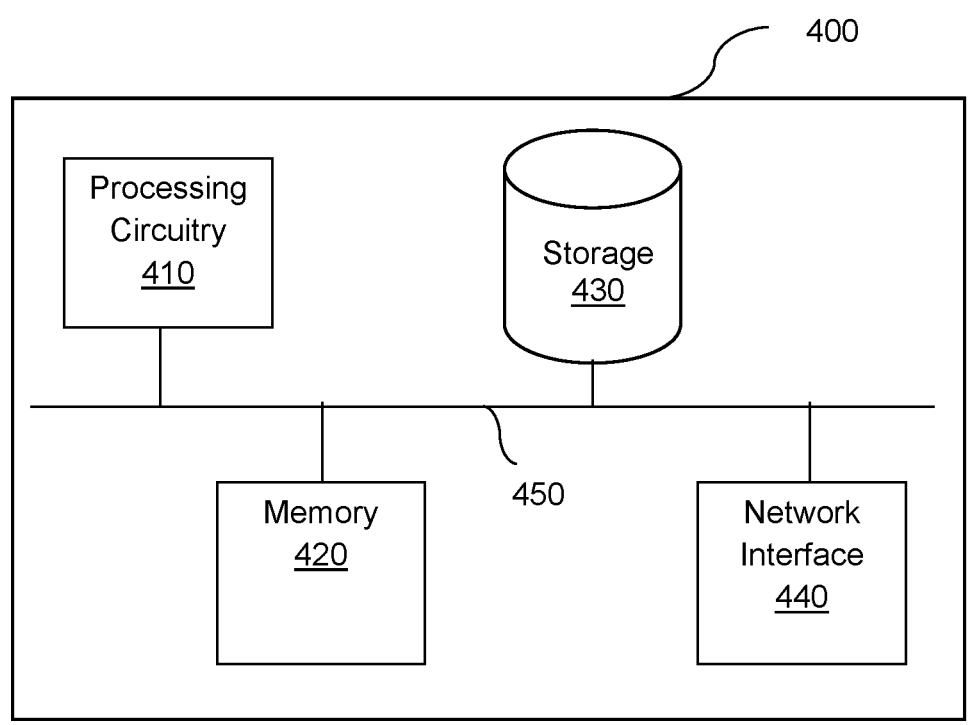
FIG. 4 is a schematic diagram of a computer hardware layer utilized to implement various disclosed embodiments.

FIG. 4 is an example schematic diagram of a computer hardware layer 400 utilized by vehicles in order to implement various disclosed embodiments. The hardware layer 400 includes a processing circuitry 410 coupled to a memory 420, a storage 430, and a network interface 440. In an embodiment, the components of the hardware layer 400 may be communicatively connected via a bus 450. The hardware layer 400 may be installed on a device that will move through a cellular network and requires connections to the cellular network such as, but not limited to, the drone 230, FIG. 2.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows an unmanned aerial vehicle having the hardware layer 400 to communicate with at least transceivers (e.g., the transceiver 110, FIG. 1).

It should be understood that the embodiments described herein are not limited to the specific architecture illustrated in FIG. 4, and other architectures may be equally used without departing from the scope of the disclosed embodiments.

It should be noted that various disclosed embodiments are discuss with respect to unmanned aerial vehicles, but that the techniques discussed herein may be applicable to other types of vehicles requiring communications with other systems in order to maintain network connections. In particular, other types of aerial vehicles, regardless of whether they are manned or unmanned, may require obtaining signals from external sources, and techniques for improving connection reliability to ensure that navigation continues unimpeded.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving connection reliability in cellular networks, comprising:
   obtaining a plurality of signals from at least one first vehicle navigating in a cellular network, wherein the cellular network is distributed over a geographic area including a plurality of cells having a plurality of transceivers, wherein each cell of the plurality of cells is a subdivision of the geographic area in which at least one transceiver of the plurality of transceivers is deployed;
   determining a plurality of signal propagation values for the plurality of transceivers based on a plurality of signals received from the plurality of transceivers by the at least one first vehicle navigating in the cellular network;
   creating a signal propagation model based on the plurality of signal propagation values and the plurality of signals;
   determining, based on the signal propagation model and an expected navigation path of a second vehicle, at least one subset of transceivers to be used for transceiver selection, wherein the at least one subset of transceivers includes the at least one subset plurality of cells from among the plurality of cells; and
   causing the at least one subset of transceivers to be used for transceiver selection with respect to the second vehicle.

2. The method of claim 1, wherein causing the at least one subset of transceivers to be used for transceiver selection with respect to the second vehicle further comprises:
   transmitting the at least one subset of transceivers to an external system, wherein the external system is configured to select transceivers from among the plurality of transceivers to be used for communications with the second vehicle.

3. The method of claim 2, wherein the external system is further configured to select the transceivers from among transceivers deployed in the at least one subset of transceivers at their respective points along the expected navigation path.

4. The method of claim 1, wherein the expected navigation path includes a sequence of points.

5. The method of claim 1, wherein the subset plurality of cells have transceivers that will provide the most reliable link for at least one point along the expected navigation path among the plurality of cells.

6. The method of claim 5, wherein a reliability of transceivers of the subset plurality of cells is determined with respect to at least one of: availability, continuity, and latency.

7. The method of claim 5, further comprising:
determining a stability score for each transceiver of the plurality of transceivers with respect to at least one point within the cellular network, wherein the subset plurality of cells is determined based further on the determined stability scores.

8. The method of claim 1, further comprising:
determining at least one predicted handover event based on the expected navigation path of the second vehicle, wherein the at least one subset of transceivers is determined based further on the at least one predicted handover event.

9. The method of claim 8, wherein determining the at least one predicted handover event further comprises:
applying a machine learning model, wherein the machine learning model is trained to output predicted handover events using a training data set including training vehicle navigation data and training handover events for historical vehicles navigating in the cellular network.

10. A non-transitory computer readable medium having stored thereon instructions for causing a processing circuitry to execute a process, the process comprising:
obtaining a plurality of signals from at least one first vehicle navigating in a cellular network, wherein the cellular network is distributed over a geographic area including a plurality of cells having a plurality of transceivers, wherein each cell of the plurality of cells is a subdivision of the geographic area in which at least one transceiver of the plurality of transceivers is deployed;
determining a plurality of signal propagation values for the plurality of transceivers based on a plurality of signals received from the plurality of transceivers by the at least one first vehicle navigating in the cellular network;
creating a signal propagation model based on the plurality of signal propagation values and the plurality of signals;
determining, based on the signal propagation model and an expected navigation path of a second vehicle, at least one subset of transceivers to be used for transceiver selection, wherein the at least one subset of transceivers includes the at least one subset plurality of cells from among the plurality of cells; and
causing the at least one subset of transceivers to be used for transceiver selection with respect to the second vehicle.

11. A system for improving connection reliability in a cellular network, comprising:
a processing circuitry; and
a memory, the memory containing instructions that, when executed by the processing circuitry, configure the system to:
obtain a plurality of signals from at least one first vehicle navigating in a cellular network, wherein the cellular network is distributed over a geographic area including a plurality of cells having a plurality of transceivers, wherein each cell of the plurality of cells is a subdivision of the geographic area in which at least one transceiver of the plurality of transceivers is deployed;
determine a plurality of signal propagation values for the plurality of transceivers based on a plurality of signals received from the plurality of transceivers by the at least one first vehicle navigating in the cellular network;
create a signal propagation model based on the plurality of signal propagation values and the plurality of signals;
determine, based on the signal propagation model and an expected navigation path of a second vehicle, at least one subset of transceivers to be used for transceiver selection, wherein the at least one subset of transceivers includes the at least one subset plurality of cells from among the plurality of cells; and
cause the at least one subset of transceivers to be used for transceiver selection with respect to the second vehicle.

12. The system of claim 11, wherein the system is a first system, wherein the first system is further configured to:
transmit the at least one subset of transceivers to a second system, wherein the second system is configured to select transceivers from among the plurality of transceivers to be used for communications with the second vehicle.

13. The system of claim 12, wherein the second system is further configured to select the transceivers from among transceivers deployed in the at least one subset of transceivers at their respective points along the expected navigation path.

14. The system of claim 11, wherein the expected navigation path includes a sequence of points.

15. The system of claim 11, wherein the subset plurality of cells have transceivers that will provide the most reliable link for at least one point along the expected navigation path among the plurality of cells.

16. The system of claim 15, wherein a reliability of transceivers of the subset plurality of cells is determined with respect to at least one of: availability, continuity, and latency.

17. The system of claim 15, wherein the system is further configured to:
determine a stability score for each transceiver of the plurality of transceivers with respect to at least one point within the cellular network, wherein the subset plurality of cells is determined based further on the determined stability scores.

18. The system of claim 11, wherein the system is further configured to:
determine at least one predicted handover event based on the expected navigation path of the second vehicle, wherein the at least one subset of transceivers is determined based further on the at least one predicted handover event.

19. The system of claim 18, wherein the system is further configured to:
apply a machine learning model, wherein the machine learning model is trained to output predicted handover events using a training data set including training vehicle navigation data and training handover events for historical vehicles navigating in the cellular network.

* * * * *